United States Patent
Harron et al.

(10) Patent No.: US 12,406,000 B2
(45) Date of Patent: Sep. 2, 2025

(54) VIDEO FINGERPRINTING

(71) Applicant: Roku, Inc., San Jose, CA (US)

(72) Inventors: Wilson Harron, Berkeley, CA (US); Matthew James Wilkinson, Emeryville, CA (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 18/318,772

(22) Filed: May 17, 2023

(65) Prior Publication Data

US 2023/0289383 A1 Sep. 14, 2023

Related U.S. Application Data

(63) Continuation of application No. 15/136,412, filed on Apr. 22, 2016, now Pat. No. 11,687,587, which is a
(Continued)

(51) Int. Cl.
*G06F 16/732* (2019.01)
*G06F 16/432* (2019.01)
(Continued)

(52) U.S. Cl.
CPC ........ *G06F 16/7328* (2019.01); *G06F 16/434* (2019.01); *G06F 16/7335* (2019.01); *G06F 16/78* (2019.01); *G06F 16/783* (2019.01)

(58) Field of Classification Search
CPC ............... G06F 16/7328; G06F 16/434; G06F 16/7335; G06F 16/78; G06F 16/783
(Continued)

(56) References Cited

U.S. PATENT DOCUMENTS 5,870,754 A * 2/1999 Dimitrova ........... G06F 16/7328
6,078,701 A 6/2000 Hsu et al.
(Continued)

FOREIGN PATENT DOCUMENTS

CN 101473657 A * 7/2009 ......... G06K 9/00744
EP 0842478 B1 * 6/2007 ............. H04N 21/84
(Continued)

OTHER PUBLICATIONS

"Automated Content Recognition: Creating Content Aware Ecosystems", A White Paper by Civolution, (Sep. 2012), 16 pages.
(Continued)

*Primary Examiner* — Phuong Thao Cao
(74) *Attorney, Agent, or Firm* — STERNE, KESSLER, GOLDSTEIN & FOX P.L.L.C.

(57) ABSTRACT

A query fingerprint of a set of frames of video content captured at a client device may be generated. Multiple patches of the set of frames of video content may be selected and a value calculated for each of the selected multiple patches. The value for each patch may be indicated as a single bit along with an additional 1-bit value to indicate whether the patch value is weak. A database of known reference fingerprints may be queried using the generated query fingerprint. Matches between the query fingerprint and the reference fingerprints may be identified. Weak bits may be given reduced weight in identifying the match of fingerprints. Based on the matches, an identifier for the video content may be returned to the client device. The client device may use the received identifier to access the supplemental content.

20 Claims, 9 Drawing Sheets

Related U.S. Application Data continuation of application No. 14/263,647, filed on Apr. 28, 2014, now Pat. No. 9,323,840, which is a continuation-in-part of application No. 13/735,426, filed on Jan. 7, 2013, now Pat. No. 9,495,451.

(51) Int. Cl.
*G06F 16/78* (2019.01)
*G06F 16/783* (2019.01)

(58) Field of Classification Search
USPC .......................................................... 707/749
See application file for complete search history.

(56) References Cited

U.S. PATENT DOCUMENTS

| | | | | |
|---|---|---|---|---|
| 6,618,507 | B1 * | 9/2003 | Divakaran | G06F 16/786 |
| | | | | 382/245 |
| 7,295,974 | B1 * | 11/2007 | Stachurski | G10L 19/12 |
| | | | | 704/219 |
| 7,774,385 | B1 | 8/2010 | Kaminski, Jr. | |
| 8,150,096 | B2 | 4/2012 | Alattar | |
| 8,458,482 | B2 | 6/2013 | Conwell | |
| 8,594,392 | B2 | 11/2013 | Bilobrov | |
| 8,611,701 | B2 * | 12/2013 | Zhang | H04N 21/26603 |
| | | | | 707/769 |
| 8,655,878 | B1 | 2/2014 | Kulkarni et al. | |
| 8,666,152 | B1 | 3/2014 | Ramanathan et al. | |
| 9,081,778 | B2 | 7/2015 | Garside et al. | |
| 9,137,568 | B2 | 9/2015 | Sinha et al. | |
| 9,323,840 | B2 | 4/2016 | Harron et al. | |
| 9,330,426 | B2 | 5/2016 | Davis et al. | |
| 9,418,297 | B2 | 8/2016 | Hefeeda et al. | |
| 9,495,451 | B2 | 11/2016 | Harron et al. | |
| 9,508,011 | B2 * | 11/2016 | Sharon | G06V 20/46 |
| 10,866,988 | B2 | 12/2020 | Harron et al. | |
| 11,687,587 | B2 | 6/2023 | Harron et al. | |
| 2003/0037010 | A1 | 2/2003 | Schmelzer | |
| 2004/0258397 | A1 * | 12/2004 | Kim | G06V 20/46 |
| | | | | 386/257 |
| 2006/0155701 | A1 | 7/2006 | Huang et al. | |
| 2006/0187358 | A1 | 8/2006 | Lienhart et al. | |
| 2007/0253594 | A1 | 11/2007 | Lu et al. | |
| 2009/0074235 | A1 | 3/2009 | Labr et al. | |
| 2009/0113545 | A1 | 4/2009 | Pic et al. | |
| 2009/0123025 | A1 | 5/2009 | Deng et al. | |
| 2009/0138108 | A1 * | 5/2009 | Teo | G10L 19/008 |
| | | | | 700/94 |
| 2009/0167942 | A1 * | 7/2009 | Hoogenstraaten | |
| | | | | H04N 21/8133 |
| | | | | 348/700 |
| 2009/0259633 | A1 | 10/2009 | Bronstein et al. | |
| 2009/0290764 | A1 * | 11/2009 | Fiebrink | G06F 16/61 |
| | | | | 382/124 |
| 2009/0324199 | A1 | 12/2009 | Haitsma et al. | |
| 2010/0007797 | A1 * | 1/2010 | Stojancic | G06F 16/7847 |
| | | | | 348/607 |
| 2010/0011392 | A1 | 1/2010 | Bronstein et al. | |
| 2010/0049711 | A1 | 2/2010 | Singh et al. | |
| 2010/0061590 | A1 * | 3/2010 | Neogi | G06V 20/40 |
| | | | | 382/100 |
| 2010/0115543 | A1 | 5/2010 | Falcon | |
| 2010/0318515 | A1 * | 12/2010 | Ramanathan | G06F 16/41 |
| | | | | 707/723 |
| 2011/0116719 | A1 | 5/2011 | Bilobrov | |
| 2011/0142348 | A1 * | 6/2011 | Radhakrishnan | G06T 1/0085 |
| | | | | 382/195 |
| 2011/0251896 | A1 * | 10/2011 | Impollonia | H04N 21/84 |
| | | | | 705/14.55 |
| 2011/0276157 | A1 * | 11/2011 | Wang | H04L 67/568 |
| | | | | 700/94 |
| 2012/0078894 | A1 | 3/2012 | Jiang et al. | |
| 2012/0131010 | A1 | 5/2012 | Wang et al. | |
| 2012/0143915 | A1 | 6/2012 | Gupta et al. | |
| 2012/0183173 | A1 | 7/2012 | Li et al. | |
| 2012/0213438 | A1 | 8/2012 | Quan | |
| 2012/0237129 | A1 | 9/2012 | Stojancic et al. | |
| 2012/0278326 | A1 * | 11/2012 | Bauer | G06F 16/41 |
| | | | | 707/E17.014 |
| 2012/0317240 | A1 * | 12/2012 | Wang | H04H 60/37 |
| | | | | 709/219 |
| 2013/0007201 | A1 | 1/2013 | Jeffrey et al. | |
| 2013/0039587 | A1 | 2/2013 | Zhang et al. | |
| 2013/0054645 | A1 | 2/2013 | Bhagavathy et al. | |
| 2013/0064417 | A1 | 3/2013 | Fernandes et al. | |
| 2013/0163957 | A1 | 6/2013 | Ikizyan et al. | |
| 2013/0177252 | A1 | 7/2013 | Hefeeda et al. | |
| 2013/0208942 | A1 * | 8/2013 | Davis | H04N 19/61 |
| | | | | 382/100 |
| 2013/0290502 | A1 | 10/2013 | Bilobrov et al. | |
| 2013/0297942 | A1 | 11/2013 | Conwell | |
| 2013/0326573 | A1 * | 12/2013 | Sharon | G06F 16/783 |
| | | | | 725/115 |
| 2014/0089307 | A1 | 3/2014 | Garside et al. | |
| 2014/0137146 | A1 | 5/2014 | Topchy et al. | |
| 2014/0193027 | A1 * | 7/2014 | Scherf | G06F 16/783 |
| | | | | 382/100 |
| 2014/0195548 | A1 | 7/2014 | Harron | |
| 2014/0236988 | A1 | 8/2014 | Harron et al. | |
| 2014/0280265 | A1 * | 9/2014 | Wang | H04H 60/37 |
| | | | | 707/758 |
| 2016/0267179 | A1 | 9/2016 | Mei et al. | |
| 2016/0267180 | A1 | 9/2016 | Harron et al. | |
| 2017/0024470 | A1 | 1/2017 | Harron et al. | |
| 2019/0251111 | A1 * | 8/2019 | Stojancic | G06V 10/462 |
| 2021/0064654 | A1 | 3/2021 | Harron et al. | |

FOREIGN PATENT DOCUMENTS

| | | | | |
|---|---|---|---|---|
| EP | 2437498 A1 * | 4/2012 | ........... | G06F 16/783 |
| KR | 20090020005 A * | 2/2009 | ........ | G06F 17/30784 |
| WO | WO-2010135082 A1 * | 11/2010 | ......... | G06F 17/3002 |
| WO | WO-2013104432 A1 * | 7/2013 | ......... | G06K 9/00053 |
| WO | WO 2015/167901 A1 | 11/2016 | | |

OTHER PUBLICATIONS

Li, Mu, "Video Fingerprinting: Algorithm Design and Performance Analysis", Information Processing and Algorithms Laboratory, Pennsylvania State University, (Oct. 19, 2012), 29 pages.

Liu, Tzu-Jui, et al., "A Robust and Lightweight Feature System for Video Fingerprinting", 20th European Signal Processing Conference (EUSIPCO), (Aug. 27-31, 2012), 160-164.

Stojancic, Mihailo, "Audio-Video Content Fingerprinting for Smart TV and Synchronous Mobile Content Identification", Zeitera, LLC., (Jun. 28, 2011), 50 pages.

International Application Serial No. PCT/US2015/027117, International Search Report mailed Aug. 5, 2015.

International Application Serial No. PCT/US2015/027117, Written Opinion mailed May 8, 2015.

International Application Serial No. PCT/US2015/027117, International Preliminary Report on Patentability mailed Nov. 10, 2016.

\* cited by examiner

VIDEO FINGERPRINTING

CLAIM OF PRIORITY UNDER 35 U.S.C. § 119(e)

The present application is a continuation of U.S. patent application Ser. No. 15/136,412, filed Apr. 22, 2016, and issued on Jun. 27, 2023 as U.S. Pat. No. 11,687,587, which is a continuation of U.S. patent application Ser. No. 14/263, 647, filed Apr. 28, 2014 and issued on Apr. 26, 2016 as U.S. Pat. No. 9,323,840, which is a continuation-in-part of U.S. application Ser. No. 13/735,426, filed Jan. 7, 2013 and issued on Nov. 15, 2016 as U.S. Pat. No. 9,495,451, which are incorporated herein by reference in their entireties.

TECHNICAL FIELD

The subject matter disclosed herein generally relates to the processing of data. Specifically, the present disclosure addresses systems and methods to identify video content via fingerprint matching.

BACKGROUND

Typically, people watch video content, such as television shows, advertisements, movies, video clips, and so on, via devices that receive a transmission from a content source. For example, a broadcaster (e.g., HBO® or CNN®), a web server (e.g., YouTube®), a peer-to-peer source (e.g., another device), and so on, streams or otherwise transmits video content to various devices capable of presenting the video content, such as televisions and associated set-top boxes, computing and/or mobile devices and associated media players or browsers, and so on.

BRIEF DESCRIPTION OF THE DRAWINGS

Some embodiments are illustrated by way of example and not limitation in the figures of the accompanying drawings.

DETAILED DESCRIPTION

Figure 1:
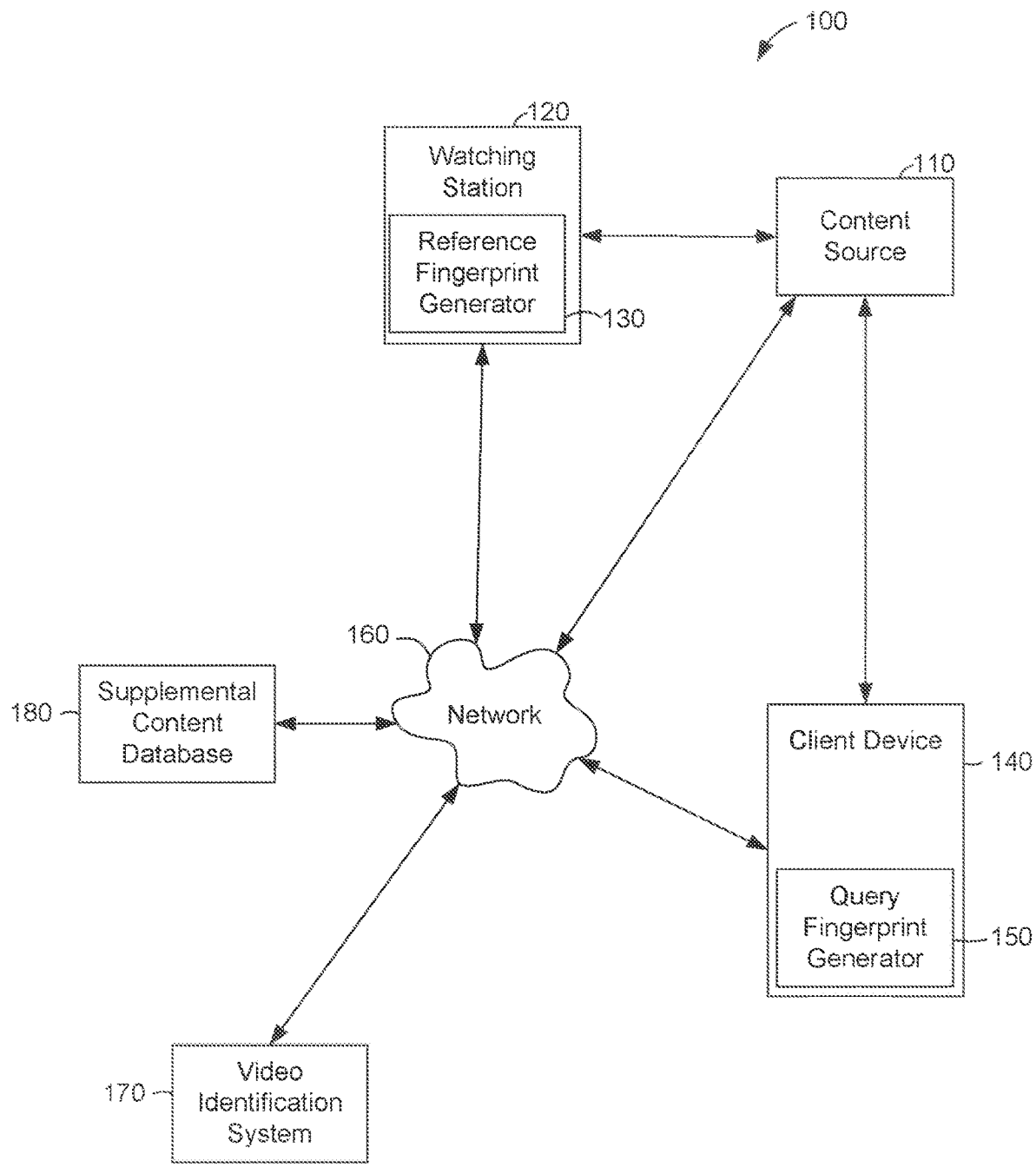
FIG. 1 is a block diagram depicting a network environment, in an example embodiment, for identifying video content via fingerprint matching.

Example methods and systems for identifying video content via fingerprint matching are described. In some example embodiments, the methods and systems generate a query fingerprint of a frame of video content captured at a client device. For example, the methods and systems may select multiple patches of the video content and calculate a value for each of the selected multiple patches using an integral image technique or other similar technique. The systems and methods may query a database of known reference fingerprints using the generated query fingerprint, determine the query fingerprint of the frame of video content matches a known reference fingerprint, and identify the video content based on the match of fingerprints.

A fingerprint may be a single frame fingerprint or a multi-frame fingerprint. A multi-frame fingerprint is a collection of single frame fingerprints along with the relative timings of the frames. The term "fingerprint" is used to refer to both single frame and multi-frame fingerprints. The term "component" is used to refer to a single frame fingerprint within a multi-frame fingerprint, when confusion might otherwise result. Note that when the frame rate is constant, a sequence of frames is sufficient to convey the relative timings of the frames.

In some example embodiments, identification of matching reference fingerprints uses a two-step process. First, a set of candidate fingerprints are identified from the reference fingerprints. Second, the matching fingerprints are identified from the candidate fingerprints. The algorithm used to identify the candidate fingerprints may be less computationally intensive than the algorithm used to identify the matching fingerprints.

In some example embodiments, individual bits of the reference and query fingerprints correspond to individual patches of individual frames of the video content. In other example embodiments, 2-, 8-, 16-, or 24-bits per patch per frame are used. In embodiments using one bit per patch per frame, an additional bit per patch per frame may be used to indicate whether the fingerprint bit is weak or not. A weak bit has a reduced confidence value and may be given less weight when determining matches. Separate from the use of the weak bit, some patches may be given more weight than others. For example, differences between a query fingerprint and a reference fingerprint corresponding to differences in a large-scale patch may be given more weight than differences based on a small-scale patch.

In some example embodiments, in response to the identification, the systems and methods may return an identifier for supplemental content associated with the identified video content to the client device. The client device may use a received identifier to access metadata, event-based content, and/or other supplemental information or content that is associated with video content and/or stored at a time or location (e.g., a frame or block of frames) within the video content that is currently being presented via the client device.

In the following description, for purposes of explanation, numerous specific details are set forth to provide a thorough understanding of example embodiments. It will be evident to one skilled in the art, however, that the present subject matter may be practiced without these specific details.

FIG. 1 is a network diagram illustrating a network environment 100 suitable for identifying video content via fingerprint matching, according to some example embodiments.

The network environment 100 may include a watching station 120 that receives video and other multimedia content from a content source 110, such as a broadcaster, web server, and so on. For example, the content source 110 may be a broadcaster, such as television station or television network, which streams or transmits media over a television channel to the watching station 120, and/or a web service, such as a website, that streams or transmits media over a network 160 to the watching station 120, among other things. The watching station 120 includes a reference fingerprint generator 130 that generates reference fingerprints of video content received from the content source 110.

One or more client devices 140 may also receive the video and other multimedia content from the content source 110, such as via a broadcast channel and/or over the network 160. The client devices 140 may include televisions, set-top boxes, laptops and other personal computers (PCs), tablets and other mobile devices, gaming devices, and other devices capable of receiving and presenting a stream of video and/or other multimedia content.

In some example embodiments, the client device 140 may include a tuner configured to receive a stream of video content and play the stream of video content by processing the stream and outputting information (e.g., digital or analog) usable by a display of the client device 140 to present the video content to a user associated with the client device 140. The client device 140 may also include a display or other user interface configured to display the processed stream of video content. The display may be a flat-panel screen, a plasma screen, a light emitting diode (LED) screen, a cathode ray tube (CRT), a liquid crystal display (LCD), a projector, and so on.

The network 160 may be any network that enables communication between devices, such as a wired network, a wireless network (e.g., a mobile network), and so on. The network 160 may include one or more portions that constitute a private network (e.g., a cable television network or a satellite television network), a public network (e.g., over-the-air broadcast channels or the Internet), and so on.

In some example embodiments, a video identification system 170 communicates with the watching station 120 and the client device 140 over the network 160. The video identification system 170 may receive a query fingerprint generated by the query fingerprint generator 150 of the client device 140, such as a fingerprint of a frame or block of frames within the video content, and query an index of known reference fingerprints generated by the reference fingerprint generator 130 of the watching station 120, in order to identify the video content by matching the query fingerprint with one or more reference fingerprints.

Upon identifying the video content, the video identification system 170 may return an identifier for supplemental content (e.g., metadata, event-based information, and so on), such as content contained in a supplemental content database 180, associated with the video content to the client device 140. Using the identifier, the client device 140 may access the supplemental content from the database 180 and present the supplemental content along with playing video content, among other things. For example, the client device 140 may access and present supplemental content from the database 180, such as listing or guide information for a broadcast channel, metadata associated with playing video content, information associated with playing video content, and so on. Metadata associated with playing video content may include a title of the content, a year of production, names of actors appearing in the content, a runtime, a rating, name of a production company, name of a distribution company, name of a network or channel broadcasting the content, and the like.

Any of the machines, databases, or devices shown in FIG. 1 may be implemented in a general-purpose computer modified (e.g., configured or programmed) by software to be a special-purpose computer to perform the functions described herein for that machine. For example, a computer system able to implement any one or more of the methodologies described herein is discussed below with respect to FIG. 9. As used herein, a "database" is a data storage resource and may store data structured as a text file, a table, a spreadsheet, a relational database, a document store, a key-value store, a triple store, or any suitable combination thereof. Moreover, any two or more of the machines illustrated in FIG. 1 may be combined into a single machine, and the functions described herein for any single machine may be subdivided among multiple machines.

Furthermore, any of the modules, systems, and/or generators may be located at any of the machines, databases, or devices shown in FIG. 1. For example, the video identification system 170 may include the query fingerprint generator 150 and frames of video content from the client device 140, and generate the query fingerprints using the included query fingerprint generator 150, among other configurations.

Figure 2:
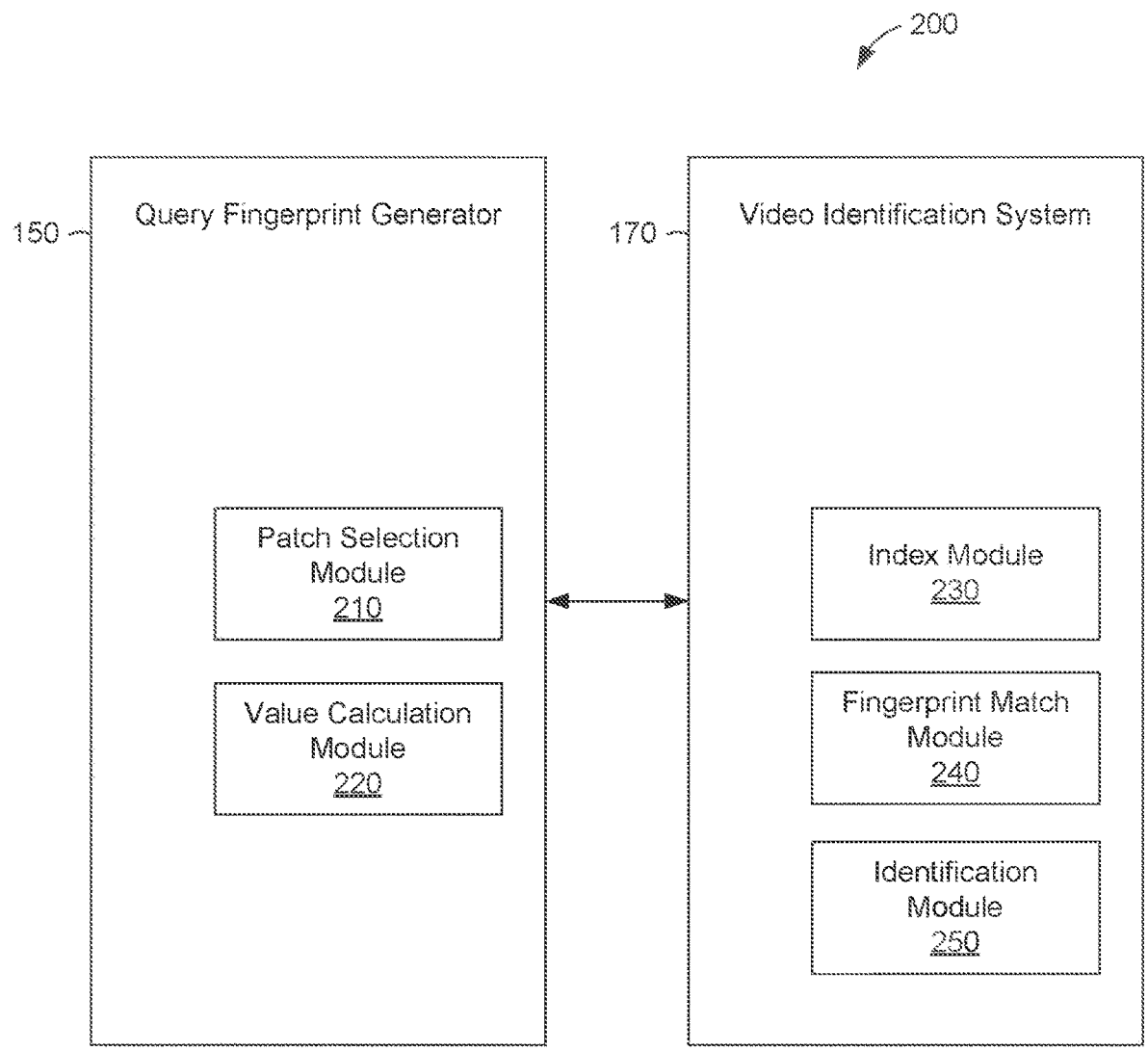
FIG. 2 is a block diagram illustrating components of a video identification system and a query fingerprint generator, according to some example embodiments.

As described herein, in some example embodiments, the systems and methods described herein utilize fingerprints of video content to identify the video content. FIG. 2 is a block diagram illustrating components of a video identification system 170 and a query fingerprint generator 150, according to some example embodiments.

The query fingerprint generator 150 of the client device 140 (or, the reference fingerprint generator 130 of the watching station 120) includes a patch selection module 210 and a value calculation module 220, all configured to communicate with each other (e.g., via a bus, shared memory, or a switch). The video identification system 170 includes an index module 230, a fingerprint match module 240, and an identification module 250, all configured to communicate with each other (e.g., via a bus, shared memory, or a switch).

One or more of the modules described herein may be implemented using hardware (e.g., a processor of a machine, a field-programmable gate array (FPGA), or an application-specific integrated circuit (ASIC)) or a combination of hardware and software (e.g., a processor configured by software). Moreover, any two or more of these modules may be combined into a single module, and the functions described herein for a single module may be subdivided among multiple modules.

In some example embodiments, the query fingerprint generator 150 is configured and/or programmed to generate a query fingerprint of one or more frames of video content captured at the client device 140. For example, the query fingerprint generator 150 may calculate values of patches, such as Haar-like features, regions, portions, and/or other aspects of one or more frames within the video content. For example, a patch may be a portion of a frame having various different geometries, Haar-like features, and so on. In some example embodiments, some or all captured patches may each have a different scale and be at a different location within a frame, among other things.

The query fingerprint generator 150 (and the reference fingerprint generator 130) generates and/or creates fingerprints for identifying video content from frames within the content. Typically, video content received by the client device 140 will be in different formats and sample rates, and the query fingerprint generator 150 creates, for some or all of the frames of the video content, a query fingerprint for each frame that is scale independent and robust to different compression artifacts, among other things. In some example embodiments, the query fingerprint generator 150 may combine the query fingerprints of each of the frames to generate a query fingerprint of a block of frames (e.g., multiple frames) of the video content. The query fingerprint generator 125 may be part of a smart television (TV), a digital video recorder (DVR), computer, or other display device. The video identification system 170 may respond to video identification requests from millions of query fingerprint generators 150.

The query fingerprint generator 125 may include a patch selection module 210 configured and/or programed to select multiple patches of the video content, such as patches associated with a displayed region of a frame or frames within the video content.

Patches may be created by dividing a frame into a grid (for example, a 2×2 grid, a 4×3 grid, or a 4×4 grid). Patches may overlap. For example, 20 patches may be used: 4 large patches corresponding to the quadrants of a frame and 16 small patches resulting from dividing the frame into a 4×4 grid. As another example, 5 patches may be used: 4 large patches corresponding to the quadrants of a frame and a fifth patch of equal size located at the center of the frame.

The query fingerprint generator 150 may also include a value calculation module 220 configured or programmed to calculate a value for each of the selected multiple patches using an integral image technique, such as a technique that calculates the values using a summed area table or other data structure that generates a sum of values in a rectangular area of a region.

For example, the patch selection module 210 may select patches, such as Haar-like features that are commonly used in object detection, of regions of a frame or frames. The value calculation module 220 may utilize the Haar-like features to generate or calculate a same value for objects in a frame, such as objects in a visual image of a frame, regardless of the relative size of the object. For example, the value calculation module 220 may generate values by approximating Gaussian filters and their derivatives using a box filter (e.g., an average of a region of the frame), wherein derivatives of the Gaussian filters are created by finding the differences in the box filters.

The query fingerprint generator 150, via the value calculation module 220, may generate a query fingerprint by calculating the values of Haar-like features, or patches, at different scales and in different locations of displayed regions of the frames of video content.

Figure 3:
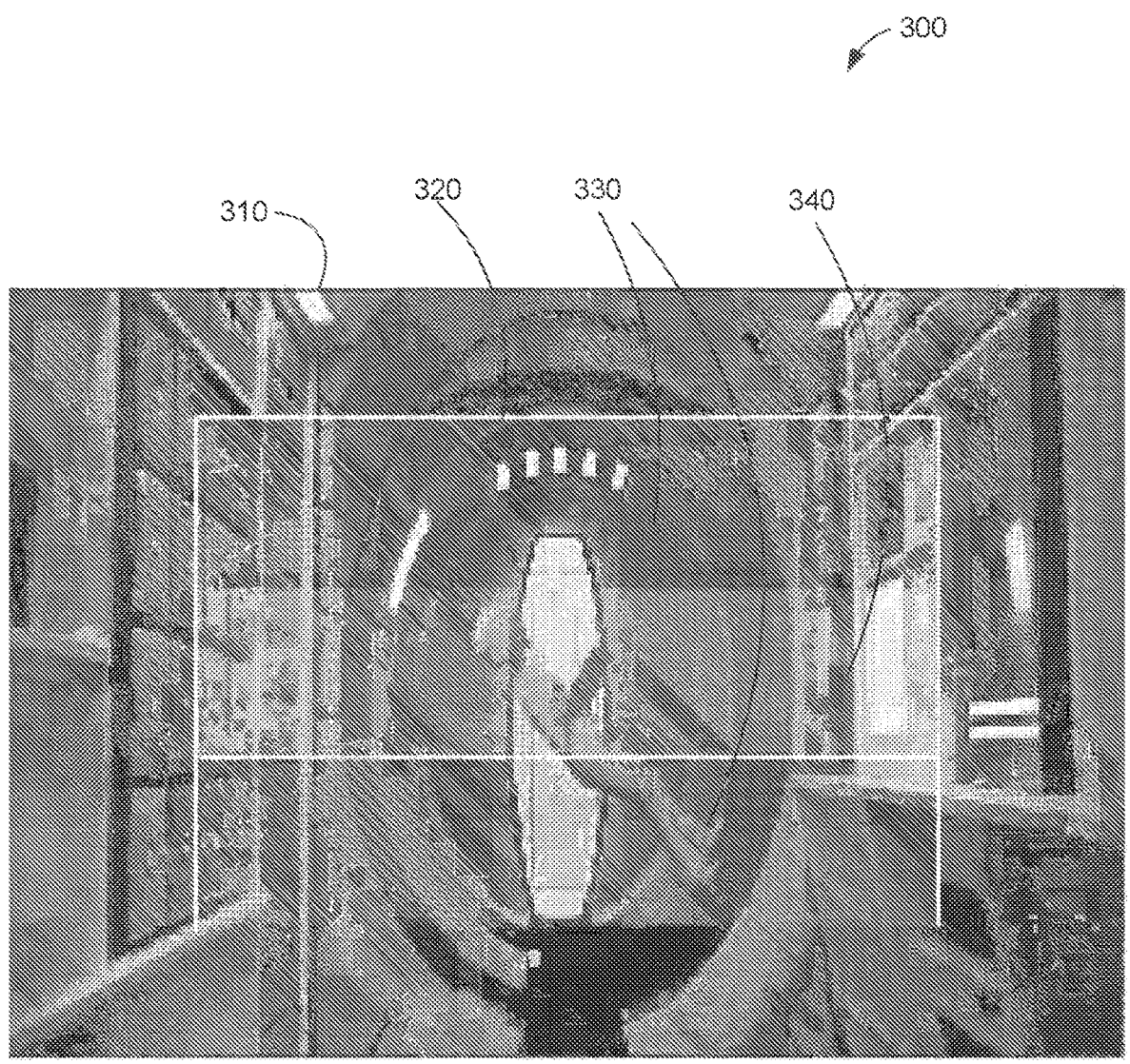
FIG. 3 is a display diagram, in an example embodiment, illustrating patches applied to a frame of video content.

FIG. 3 is a display diagram 300 illustrating a first patch 320 applied to a frame 310 of video content. The patch 320 includes a middle region 340 and outer regions 330. The value calculation module 220 may calculate a value of the patch 320 by subtracting the middle region 340 from the outer regions 330, in order to determine what region of the patch 320 has a higher amount of energy. The energy of each region may be determined by the brightness of the pixels in the region, the number of transitions between light and dark pixels in the region, or using some other means.

Figure 4:
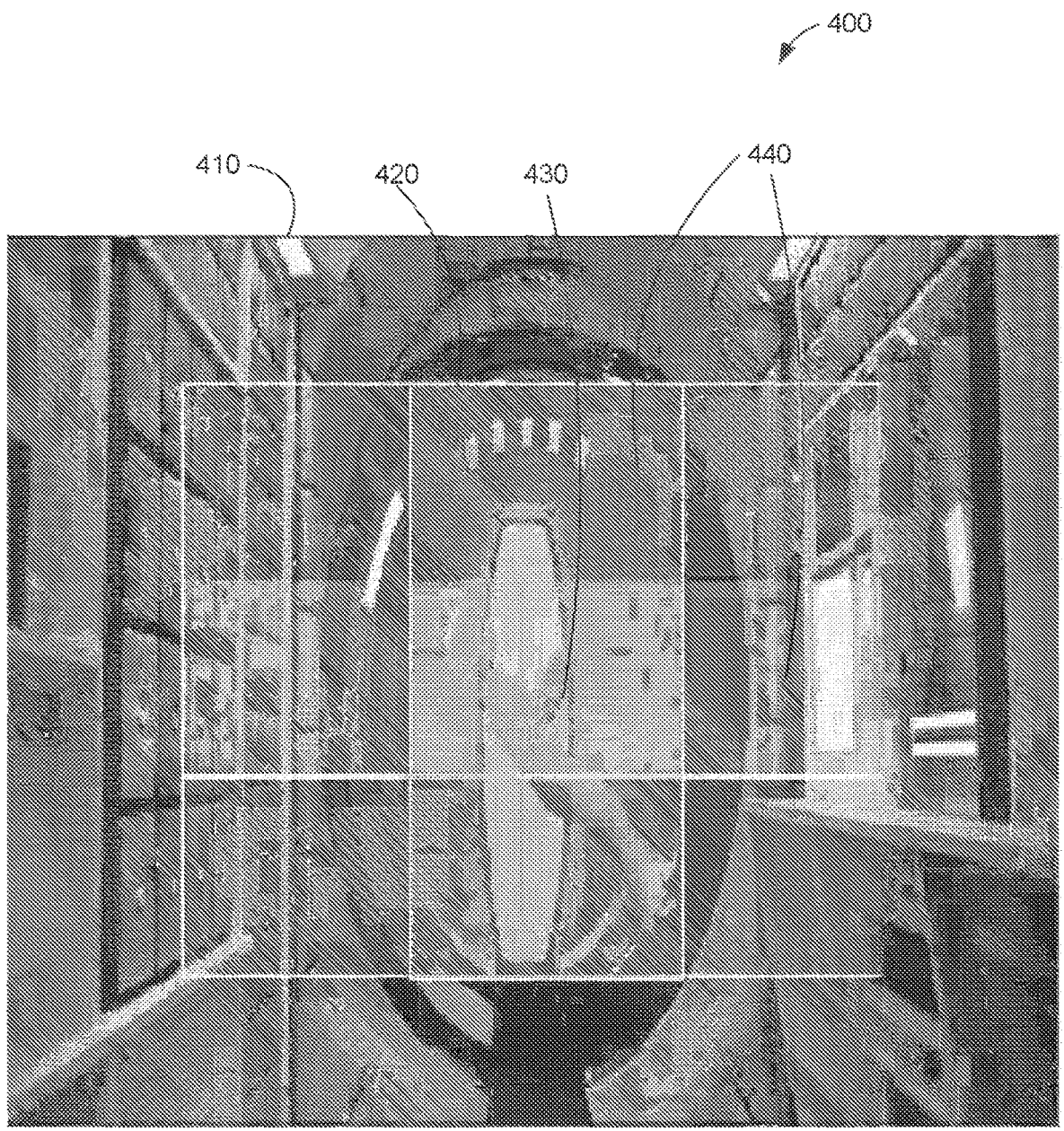
FIG. 4 is a display diagram, in an example embodiment, illustrating patches applied to a frame of video content.

FIG. 4 is a display diagram 400 illustrating a second, different, patch 420 applied to a frame 410 of video content. The patch 420 includes a middle region 430 and outer regions 440. The value calculation module 220 may calculate a value of the patch 420 by subtracting the middle region 430 from the outer regions 440, in order to determine what region of the patch 420 has a higher amount of energy.

In some example embodiments, the patch selection module 210 selects 32 patches, which include 8 patches for the first 8 regions of a frame and 24 other patches of the left-right and top-bottom features of each region of the frame that results when the frame is divided into a 4×3 grid of 12 regions. The regions may be of different sizes and overlapping or non-overlapping. For example, the first 8 regions may be larger regions reflecting the left-right and top-bottom features of each quadrant of the frame. Of course, the patch selection module 210 may select a different number of patches or a different configuration of patches.

In some example embodiments, the value calculation module 220 calculates a query or reference fingerprint by utilizing integral image techniques. For example, the value calculation module 220 may calculate an integral image, which is a summed image where each pixel is an accumulation of values of the pixels above and to the left, as well as the current pixel. The integral image technique may enable an efficient creation of a fingerprint once an integral image is created, among other benefits. Further efficiencies may be realized by using Integrated Performance Primitive (IPP) libraries (created by Intel®), to create the integral image, and/or by skipping columns and/or rows while generating the integral image in order to process smaller amounts of data, among other things.

Using the integral images, the value calculation module 220 may then calculate values for multiple regions or patches of a frame, such as by using the following formula:

$$FP(i,j,w,h)=I_{int}(i,j)-I_{int}(i+w,j)-I_{int}(i,j+h)+I_{int}(i+w,j+h).$$

The formula above shows that the fingerprint value for a patch starting at the (i, j) coordinates and of size (w, h) is calculated by adding the integral image value at the (i, j) coordinates to the integral image value at the opposite corner of the patch, and subtracting the integral image values at the other two corners. Since the integral image is a cumulative sum of the image in both dimensions, this calculation finds the sum of the energy of all pixels in the given region.

In this example, the value calculation module 220 calculates values for the patches or regions of a frame as 16-bit integers because the range is [−255, 255], which is outside the range of an 8-bit integer. Additionally, the calculated patches or regions of a frame may be weighted by their size, and the calculated values may be floating point values. To capture this information, the values for the fingerprint are scaled to a full 16-bit range. However, in some example embodiments, the values may be quantized to 1-bit or 8-bits, reducing the storage space of a generated fingerprint (e.g., from 64 bytes to 32 bytes or 4 bytes), among other things.

In some example embodiments, the query fingerprint generator 150 may verify whether one or more frames of video content includes pillar bars. Pillar bars are added to a frame of video content when the aspect ratio of a source device is different from an aspect ratio of a display device. For example, in broadcasting, pillars are commonly added when video content having 4:3 aspect ratio is displayed on a television having a 16:9 aspect ratio. In these scenarios, the query fingerprint generator 150 may verify whether frames include pillar bars, as included pillar bars may affect the identification of fingerprints, among other things.

In some examples, in order to identify pillar bars in a frame of video content, the query fingerprint generator 150 may perform a binary search of the calculated integral image to find edges of the image content. For example, the query fingerprint generator 150 may utilize a pillar bar algorithm in order to identify regions of actual video content within a frame, and not the pillar bars. The following is an example algorithm for finding a left pillar bar in a frame of video content. The algorithm returns the right-hand edge of the left pillar bar, given access to the fingerprint function for the image and the width and height of the image.

```
function FindLeft(w, h)
    x ← w/3
    Δx ← w/3
    while Δx > 1 do
        Δx < Δx/2
        fp ← FP_{LvR}(0,0,x,h)
        if |fp| < threshold then
            x ← x + Δx
        else
            x ← x - Δx
        end if
    end while
    return x
end function
```

For every iteration, the algorithm may calculate the Haar-like feature (Left vs. Right) from the left edge of the image to the value of x, and when the area is generally flat (e.g., the same image content from Left to Right), then x is moved further into the image; when there is a significant difference, x is moved further out of the image. As the algorithm runs, the amount that x is adjusted by ($\Delta x$) is halved, which allows the algorithm to run in log(n) time to find the pillar box (e.g., where n is one-third the width or height of the image).

The references may be quantized and subsampled after initial generation and prior to storage. For example, a 15 frames per second (fps) 16-bit fingerprint may be changed to a 5 fps 1-bit fingerprint by discarding two-thirds of the frames and quantizing the 16-bit values to 1-bit values. After storage, the reference fingerprint may be added to an index by taking all or a subset of the frames of the reference fingerprint, applying a hash function, and storing a reference to the fingerprint in the index under the value from the hash function. In this way, the reference fingerprint can be found when a matching hash value is known. Accordingly, by dividing the reference fingerprints into a number of hash buckets, a fast match on the hash value can be performed, followed by a slower matching algorithm against the fingerprints in the matching bucket.

Any hash function may be used for dividing the reference fingerprints into buckets. An example 8-bit hash function is to pick three values of the fingerprint (e.g., the first three regions of the first frame of the fingerprint or the first region of the first three frames of the fingerprint) and concatenate them into a 24-bit number, then modulus the 24-bit number by the desired number of buckets. Similarly, four values may be concatenated into a 32-bit number and a modulus by the desired number of buckets performed on the 32-bit number. As another example, the selected values can be scaled by the sum of the absolute value of all regions in the fingerprint, and then modulus by the desired number of buckets performed. An example 1-bit hash function of frames divided into 32 regions is to treat the 32 1-bit fields as a single 32-bit number and modulus that 32-bit number by the desired number of buckets.

The index may include every reference frame or a subset of the reference frames. For example, a 30 fps reference may have only 5 fps in the index. As another example, a 60-minute, 30 fps reference may be divided into chunks of a predetermined size (e.g., 1 second) and a predetermined number of frames at the beginning of each chunk added to the index. For example, the first 5 frames of each second may be indexed.

The video identification system 170 includes the index module 230, the fingerprint match module 240, and the identification module 250, among other modules, which are configured and/or programmed to match a query fingerprint to a known reference fingerprint.

In some example embodiments, the index module 230 is configured and/or programmed to query a database of known reference fingerprints of video content captured at a reference device, such as the watching station 120. For example, the index module 230 may query an index stored within a database of the watching station 120, an index stored within the video identification system 170, and so on.

For example, the index module 230 may be configured to query an index of quantized patch values of the known reference fingerprints. The index module 230 may query an index of 1-, 2-, 8-, 16-, and/or 24-bit numbers that are associated with single frames of the reference fingerprints. The index module 230 may derive the numbers by quantizing one or more patch values of the reference fingerprints. For example, the index module 230 may normalize fingerprint values by their absolute sum, by log normalization, and so on.

The index module 230 may index some or all frames of the reference fingerprints using the best or better correlated values of large regions of the frames. The index module 230 may create an index using highly correlated values of the full frame patches, because the features associated with the best correlated values may represent the remaining patches of a frame, among other things. The highly correlated values may be pre-determined using a sample data set.

For example, when three regions of a frame are the best correlated values, the index module 230 quantizes each of the three values to 8-bits, such as by placing them in an evenly spaced histogram with a maximum and minimum limit, thereby creating a 24-bit number. The index module 230 may then utilize a reference fingerprint index of 24-bit numbers to quickly look up and/or identify frames. In some example embodiments, a fuzzy search is performed. The fuzzy search can find matches that are inexact. For example, a fuzzy match for the three 8-bit values may be found when the matching values match exactly or are within one of the corresponding value. In this example, there are 27 permutations per index to parse when attempting to match fingerprints, with three matching values for each of the three bytes. Similarly, when four 8-bit values are used with a fuzzy match of the same degree (i.e., with a maximum distance of 1 per value), there are 81 permutations per index. Larger degrees and/or more values increase the number of possible permutations.

As another example, the index module 230 may quantize each of the three values to 1-bit, such as by comparing each value to a threshold, thereby generating a 3-bit number. The index module 230 may then utilize a reference fingerprint index of 3-bit numbers to quickly look up and/or identify frames, because there are only 8 values per index to compare when attempting to match fingerprints.

In another example embodiment, 32 regions are used and each region is represented by a single bit. The 32-bit value may be hashed to generate a key. For example, if 256 hash values are used, the top 8 bits of the 32-bit value may be used as the hash. To lookup the fingerprint, potentially matching fingerprints with the same hash value are iterated over and compared.

In some example embodiments, the fingerprint match module 240 is configured and/or programmed to determine that a query fingerprint matches at least one known reference fingerprint. For example, the fingerprint match module 240 may determine that a query fingerprint matches at least one known reference fingerprint by determining that a similarity between the query fingerprint and at least one of the known reference fingerprints satisfies a predetermined threshold associated with a Tanimoto distance measurement, a Manhattan distance measurement, and/or other distance measurements associated with matching images or other visual-based content.

For example, the fingerprint match module 240 may compare a query fingerprint to one or more reference fingerprints using the Tanimoto or the Manhattan distance measurements, and determine that the fingerprints match when the comparison indicates that the distance measurement satisfies a predetermined threshold (e.g., is within a certain distance threshold). Of course, the fingerprint match module 240 may utilize other matching techniques in order to determine whether a query fingerprint matches a reference fingerprint, such as Euclidean, Cosine, KL-Divergence and/or Itakura distance measurement techniques, among other distance measurement techniques.

In some example embodiments, the video identification system 170 may utilize various different block sizes (e.g., number of frames, or frame rate) of fingerprints when matching a query fingerprint to a reference fingerprint. For example, the reference fingerprint may be set at 5 fps, and occupy approximately 560 KB/h of runtime given an 8-bit value (32 bytes/frame) for the fingerprint, and the query fingerprint, which may include offset errors, may be set at 15 fps or higher. In this example, a query of the index may involve querying multiple reference frames (e.g., 3 frames for a reference fingerprint) of the reference fingerprint index. As another example, the reference fingerprint may be set at 15 fps while the query fingerprint is set at 5 fps. In this example, comparing the query fingerprint to the reference fingerprint may involve comparing each of the query fingerprint frames to multiple reference frames of the reference fingerprint index.

Thus, in some example embodiments, the video identification system 170 may optimize a match rate for matching a query fingerprint to a reference fingerprint by modifying the block sizes of the fingerprints. For example, fingerprint match module 240 may match a query fingerprint to one second of reference video content, 0.5 second of reference video content, one minute of reference video content, and so on. In some cases, the precise time of the match may not be able to be determined. For example, if a video includes a still image, then any portion of the video showing the still image would match the entire length of the still image segment.

As discussed above, some patches may have different scales than other patches. Large-scale patches may be more important in identifying matches than low-scale patches. For example, using 1-bit values, a match may be identified based on the number of mismatched bits being below a threshold, with all bits being treated equally. As another example, a match may be identified based on a number of mismatched low-scale bits being below a first threshold and the number of mismatched large-scale bits being below a second threshold. The second threshold may be zero.

In some example embodiments, the identification module 250 is configured and/or programmed to identify video content captured at a client device 140 based on a determination that a query fingerprint matches at least one reference fingerprint. For example, the identification module 250 may identify the name or title of the video content, a location within the video content currently being presented by the client device 140, a channel or broadcaster providing the video content, and so on.

Figure 5:
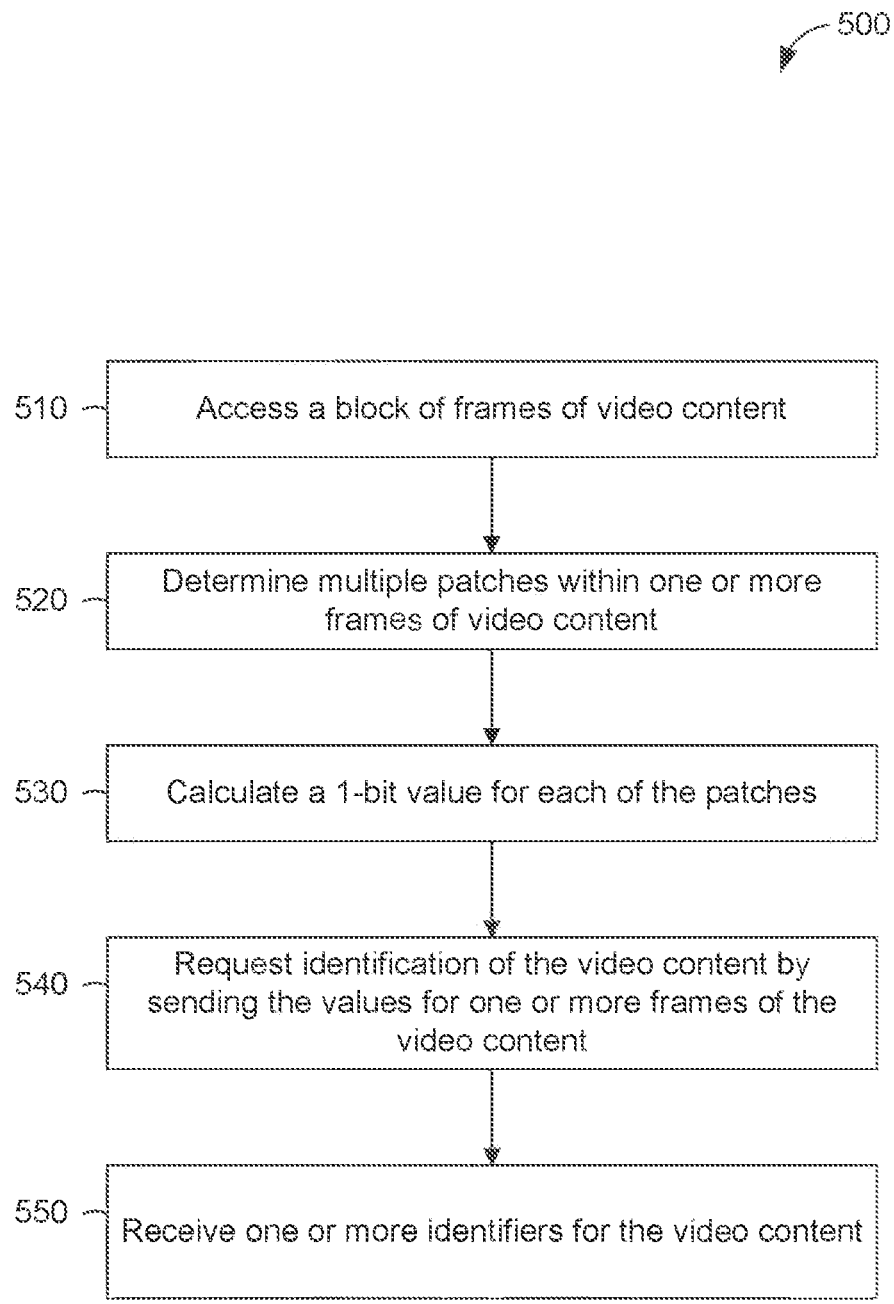
FIG. 5 is a flowchart illustrating a method, in example embodiments, for identifying video content via fingerprint matching.

FIG. 5 is a flow diagram illustrating an example method 500 for generating a query fingerprint, according to some example embodiments. The method 500 may be performed by the query fingerprint generator 150 and/or the reference fingerprint generator 150 and, accordingly, is described herein merely by way of reference thereto. It will be appreciated that the method 500 may be performed on any suitable hardware.

In operation 510, the query fingerprint generator 150 accesses a frame or block of frames of video content. For example, the query fingerprint generator 150 may access one or more frames of video content currently playing on the client device 140.

In operation 520, the query fingerprint generator 150, or the reference fingerprint generator 130, selects multiple patches, of one or more frames of video content, that are associated with a displayed region of the video content. For example, the patch selection module 210 selects multiple patches (e.g., 32 patches) of regions of a displayed frame, or patches from multiple frames within a block of frames, among other things.

In operation 530, the query fingerprint generator 150 calculates a 1-bit value for each of the selected multiple patches. In some example embodiments, an integral image technique is used. For example, the value calculation module 220 calculates values for each of the selected regions using the techniques described herein. The calculated values may include values for large regions of a frame, small regions of a frame, regions that overlap (e.g., regions where a smaller patch overlaps a larger patch of a frame), and so on. The calculated value for each of the selected multiple patches may be directly calculated as a one-bit binary value. Alternatively, the calculated value for each of the selected multiple patches may be initially calculated as a multi-bit value (e.g., an 8-bit value, a 32-bit value, or a value of some other size). The multi-bit value may be compared to a threshold to generate a 1-bit value. For example, the threshold may be zero, and all positive multi-bit values are converted to one 1-bit value (e.g., "1") while all zero or negative multi-bit values are converted to another 1-bit value (e.g., "0"). Other threshold values may also be used.

In operation 530, an additional bit of data for each patch may also be generated. The additional bit of data may indicate whether the 1-bit value is strong or weak. A weak value may be given decreased weight by the video identification system 170 in determining whether fingerprints match. The decision to set a weak bit may be based on the proximity of the multi-bit value of a patch to the threshold. For example, if the threshold is 0 and signed 8-bit values are calculated, the weak bit for a patch may be set if the 8-bit value is within the range of −64 to 64.

In some example embodiments, the number of weak bits for a frame has a predetermined value. For example, if two weak bits are used, then the two patches having values closest to the threshold may be assigned as weak and all other patches may be assigned as not weak.

In some example embodiments, the number of weak bits for a frame has a predetermined maximum value. For example, if a maximum of two weak bits are used, then the values for each patch may be checked to determine if they are within a set range of the threshold (e.g., within the range −64 to 64 as discussed above). If the number of values within the set range is less than or equal to two, then the weak bits will be set based on the set range. If the number of values within the set range is greater than two, then the two values closest to threshold will be assigned as weak bits.

Thus, the query fingerprint generator 150 or the reference fingerprint generator 150 may generate a query fingerprint for a single frame and/or a block of frames of video content by selecting patches of regions (e.g., Haar-like features) of the frame or frames, calculating values for each of the selected patches, and performing integral image techniques to generate a query fingerprint using the calculated values for the selected patches, among other things.

In operation 540, the client device 140 requests identification of the video content by sending the values for one or more frames of the video content to the video identification system 170 via the network 160.

In operation 550, the client device 140 receives one or more identifiers for the video content. The identifiers for the video content may be sent by the video identification system 170 via the network 160. The identifiers for the video content may be numeric (e.g., a unique numeric identifier for the video content), alphanumeric (e.g., a name of the video content), graphical (e.g., an image of a name of the video content, an image of one or more actors appearing in the video content, or another image associated with the video content), or in another form.

Figure 6:
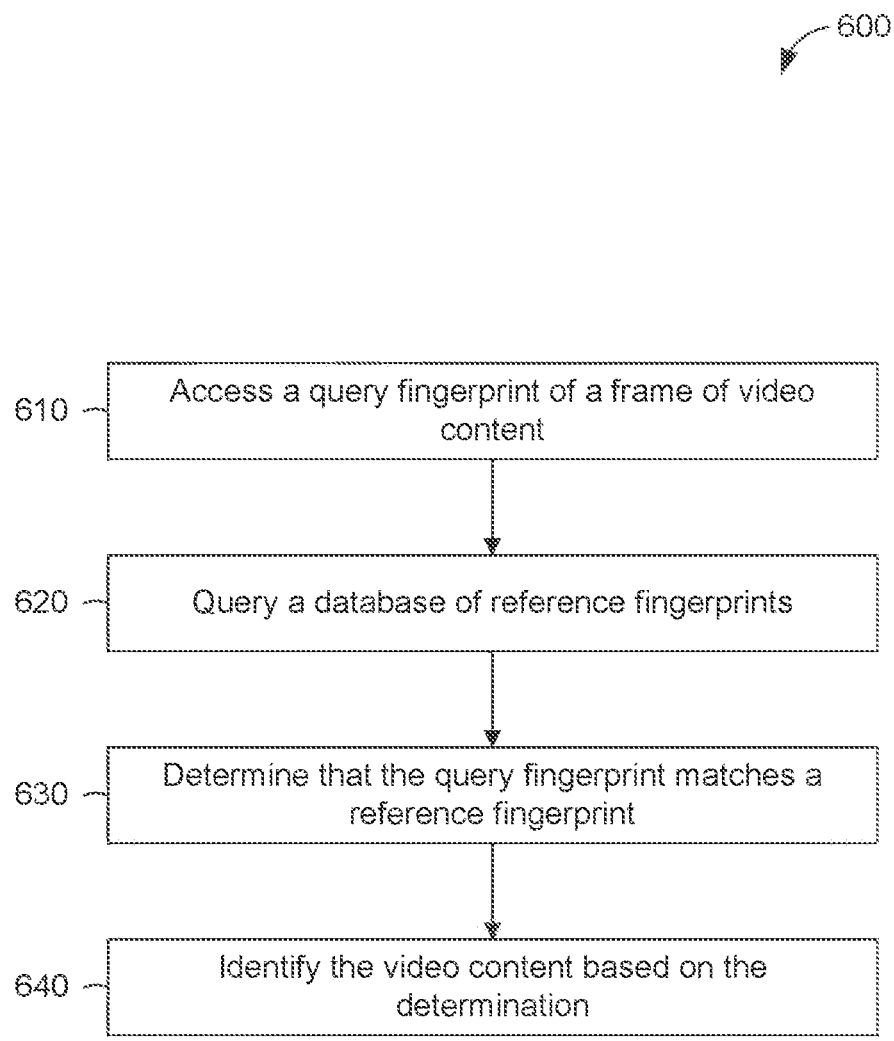
FIG. 6 is a flowchart illustrating a method, in example embodiments, for identifying video content via fingerprint matching.

FIG. 6 is a flow diagram illustrating an example method 600 for identifying video content, according to some example embodiments. The method 600 may be performed by the video identification system 170 and, accordingly, is described herein merely by way of reference thereto. It will be appreciated that the method 600 may be performed on any suitable hardware.

In operation 610, the video identification system 170 accesses a query fingerprint of video content that is based on multiple patches of a frame or frames of video content captured at a client device. For example, the video identification system 170 may access and/or receive a query fingerprint from the query fingerprint generator 150 of the client device 140.

In operation 620, the video identification system 170 queries a database of reference fingerprints associated with frames of known video content. Prior to querying the database, the query fingerprint may be quantized to match the format of the reference fingerprints. For example, if the query fingerprint contains 8 bits per region for 32 regions of each frame and the reference fingerprints store 1-bit values for each region, the 8-bit values of the query fingerprint can be truncated to 1-bit values. All or a subset of the frames of the query fingerprint may be used to look up the matching frames in the index. The same hash function that was run when storing the reference fingerprints in the index is used on the query fingerprint to identify reference fingerprints having matching hash values. The reference fingerprints having matching hash values are then compared to the query fingerprint to identify matching reference fingerprints.

For example, the index module 230 may query an index of quantized patch values of the known reference fingerprints. Each known reference fingerprint may be composed of components corresponding to frames of video content. For example, a 90-minute movie sampled at 15 fps may be divided into 81,000 components (one for each sampled frame). Fingerprints may be stored for segments within the movie, or dynamically generated as needed. For example, a fingerprint for each 1-second segment may include 15 components, with each component corresponding to a frame of the movie displayed during the 1-second segment.

In operation 630, the video identification system 170 determines that the query fingerprint matches at least one of the reference fingerprints. For example, if each frame of the query fingerprint matches a corresponding frame of the reference fingerprint, the query fingerprint can be found to match the reference fingerprint. For example, the fingerprint match module 240 may determine that a query fingerprint matches at least one known reference fingerprint by determining that a similarity between each frame of the query fingerprint and each frame of at least one of the query reference fingerprints satisfies a predetermined threshold associated with a Tanimoto distance measurement, a Manhattan distance measurement, and/or other distance measurements associated with matching images or other visual-based content. In some example embodiments, a subset of the frames of the query fingerprint is used. For example, if the query fingerprint has more fps than the reference fingerprint, a subset of the frames the query fingerprint may be used.

In some example embodiments, the video identification system 170 may determine that two or more query fingerprints match two or more reference fingerprints by using various distance measurement techniques, among other things. For example, the video identification system 170 may identify video content based on a match of multiple fingerprints.

In operation 640, the video identification system 170 identifies the video content captured at the client device based on the determination that the query fingerprint matches at least one of the reference fingerprints. For example, the identification module 250 may identify the name or title of the video content, such as the name of a movie, television program, video clip, video game, and so on.

In some example embodiments, and in response to identifying the video content, the video identification system 170 may return an identifier for supplemental content associated with the identified video content to the client device 140. Records in the reference fingerprint database accessed in operation 620 may include the identifier for the video content from which each reference fingerprint was derived. Based on identifying one or more matching reference fingerprints, the identifiers for the video content can be retrieved by the video identification system 170 and transmitted to the client device 140. The client device 140 may use the received identifier to access metadata, event-based content, and/or other supplemental information or content that is associated with the identified video content and/or associated with a time or location (e.g., a frame or block of frames) within the video content that is currently being presented via the client device. For example, the identifier could be used to access records in a database on the client device or on a server device. The records may contain the identifier along with the metadata, event-based content, and other supplemental information. The metadata, event-based content, and other supplemental information may be stored as text, images, sound data, or use additional levels of indirection such as another level of identifiers, file names, uniform resource locators (URLs), or the like.

Event-based content is content is based at least partially on an event independent of the identified video content. For example, an advertisement for a future sporting event may be presented to viewers of video content identified as a sporting event. The choice to display the event-based content may be partially based on the identified video content, but is not as tightly bound to the identified video content as the metadata regarding the content is. As another example, based on the identified video content and a known line-up for a station broadcasting the identified video content, the show playing after the identified video content may be determined and information regarding that show displayed as event-based content.

Figure 7:
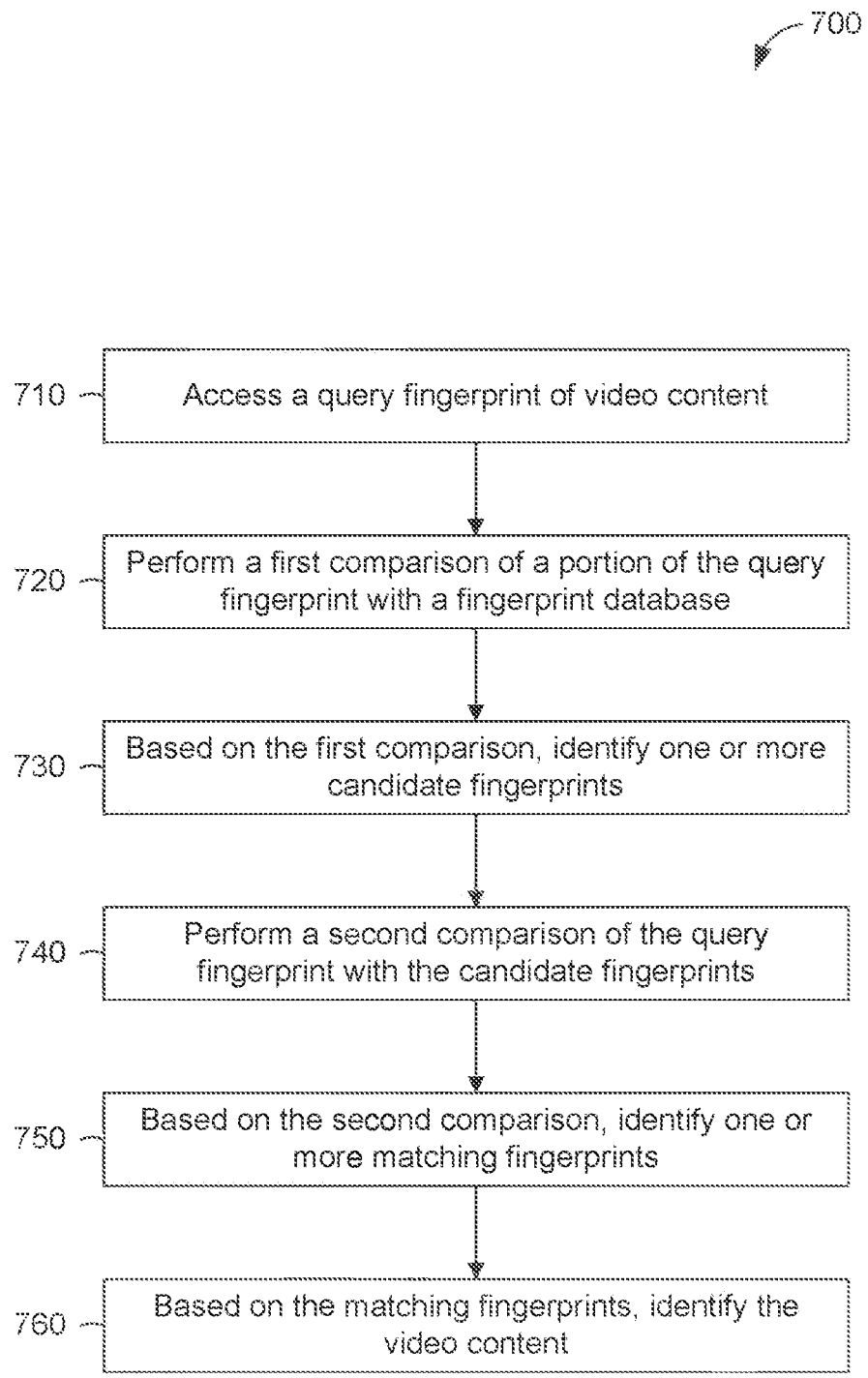
FIG. 7 is a flowchart illustrating a method, in example embodiments, for identifying video content via fingerprint matching.

FIG. 7 is a flow diagram illustrating an example method 700 for identifying video content, according to some example embodiments. The method 700 may be performed by the video identification system 170 and, accordingly, is described herein merely by way of reference thereto. It will be appreciated that the method 700 may be performed on any suitable hardware.

In operation 710, the video identification system 170 accesses a query fingerprint of video content that is based on multiple patches of multiple frames of video content captured at a client device. For example, the video identification system 170 may access and/or receive a query fingerprint from the query fingerprint generator 150 of the client device 140.

The method 700 may be performed in an iterative fashion, with different related query fingerprints used in each iteration. For example, a user may turn on a television, change a channel, begin playing a streaming video, or otherwise initiate playback of video content. A query fingerprint based on the first second of video content may be generated and transmitted to the video identification system 170 for accessing during operation 710. As discussed below, with respect to operation 760, the client device 140 may receive multiple matching identifiers of video content. A second query fingerprint based on the first two seconds of video content may be used in a second iteration of the method 700. Based on the additional data in the second query fingerprint, fewer matching reference fingerprints may be identified. The process may be repeated a set number of times or until a single matching reference fingerprint is found. In an alternative embodiment, the client device 140 may send successive query fingerprints based on non-overlapping video data. The video identification system 170 may concatenate the successive query fingerprints to generate larger fingerprints (e.g., concatenate two one-second fingerprints to generate a two-second fingerprint).

In operation 720, the video identification system 170 queries a database of reference fingerprints associated with frames of known video content. For example, the index module 230 may query an index of quantized patch values of the known reference fingerprints. The query is based on a portion of the query fingerprint. For example, the query fingerprint may include data regarding 8 patches on each of 5 frames. The query may be based on 3 of the patches for all 5 frames, all 8 patches for the first frame, or another subset of the query fingerprint. One potential benefit of identifying candidate fingerprints using a subset of the query fingerprint is that the initial query may be processed more quickly than a query using the full query fingerprint would be. In some example embodiments, the first frame of the query fingerprint is used, the first two frames of the query fingerprint are used, or the entire query fingerprint is used.

In operation 730, the video identification system 170 identifies one or more candidate fingerprints. For example, multiple candidate fingerprints may be exact matches for the subset of the query fingerprint. As another example, multiple candidate fingerprints may be within a predetermined error distance of the query fingerprint. The query fingerprint may include weak bits. Mismatches on weak bits may be given less weight than mismatches on other bits in determining the error distance between the query fingerprint and the candidate fingerprints. In some example embodiments, multiple match attempts may be made, with some weak bits flipped in each attempt. For example, in a query fingerprint with two weak bits, four match attempts for each reference fingerprint could be made, one for each combination of values of the weak bits. The Hamming distance of the weak bits may be calculated independently of the Hamming distance of the other bits. For example, a 32-bit query fingerprint with two weak bits can match a reference fingerprint where the two weak bits are within a Hamming distance of two of the reference bits and the 30 other bits are within a Hamming distance of two of the reference bits. That is, a match would be found regardless of the value of the weak bits, and when up to two of the remaining 30 bits do not match. The candidate fingerprints may be dynamically generated from component data. For example, a one-second candidate fingerprint may be generated during the operation 730 from individual frame components. As another example, a two-second candidate fingerprint may be generated during the operation 730 by combining data from two adjacent one-second fingerprints.

In operation 740, the video identification system 170 performs a comparison of all or a portion of the query fingerprint with the candidate fingerprints. For example, the entire query fingerprint may be used to determine if the query fingerprint matches each candidate fingerprint. As another example, the portion of the query fingerprint not used in operation 720 may be used in operation 740. As another example, a different subset of the query fingerprint from the portion of the query fingerprint used in operation 720 may be used in operation 740.

In operation 750, the video identification system 170 determines the query fingerprint matches at least one of the candidate fingerprints. For example, the fingerprint match module 240 may determine that a query fingerprint matches at least one known candidate fingerprint by determining that a similarity between the query fingerprint and at least one of the query reference fingerprints satisfies a predetermined threshold associated with a Tanimoto distance measurement, a Manhattan distance measurement, and/or other distance measurements associated with matching images or other visual-based content.

In some example embodiments, the video identification system 170 may determine that two or more query fingerprints match two or more candidate fingerprints, by using various distance measurement techniques, among other things. For example, the video identification system 170 may identify video content based on a match of multiple fingerprints.

In operation 760, the video identification system 170 identifies the video content captured at the client device based on the determination that the query fingerprint matches at least one of the reference fingerprints. For example, the identification module 250 may identify the name or title of the video content, such as the name of a movie, television program, video clip, video game, and so on.

Figure 8:
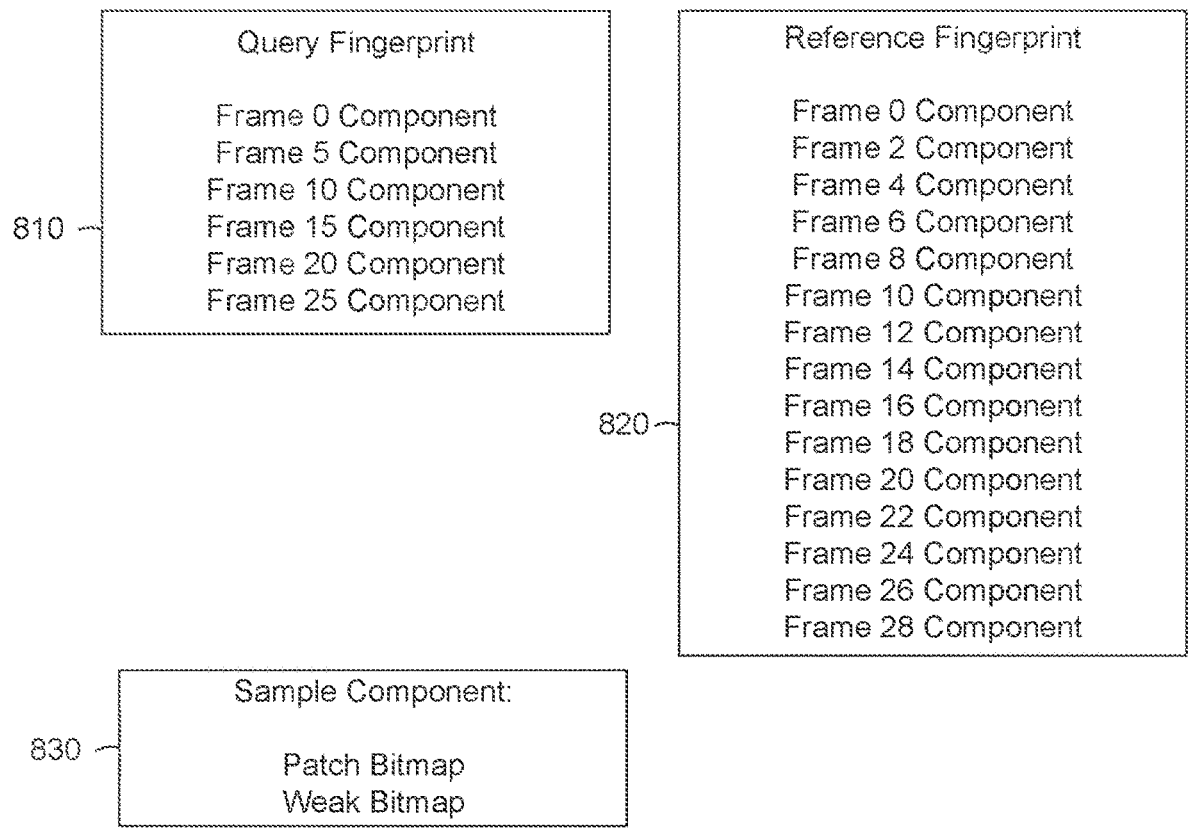
FIG. 8 is a block diagram illustrating data structures, in example embodiments, for identifying video content via fingerprint matching.

FIG. 8 is a block diagram illustrating data structures, in example embodiments, for identifying video content via fingerprint matching. Three data structures are shown: a query fingerprint 810, a reference fingerprint 820, and a sample component 830. The query fingerprint 810 and reference fingerprint 820 are created from the same fingerprint algorithms and patch locations. In different example embodiments, different fingerprint algorithms and patch locations may be used.

The query fingerprint 810 may consist of multiple components. Each component may be a fingerprint for a frame of video content. As shown in the sample component 830, a component may include a patch bitmap and a weak bitmap.

Each bit in the patch bitmap corresponds to a patch in a frame of video content. In some example embodiments, the patch bitmap is larger than the number of patches and the excess bits are set to zero or ignored. For example, if the patch bitmap is a 32-bit value and 12 patches are used, 20 bits may be set to zero or ignored while 12 bits will correspond to the 12 patches. Each bit in the weak bitmap corresponds to a bit in the patch bitmap. The weak bitmap indicates which of the bits in the patch bitmap are considered weak. For example, a 1 value in the $12^{th}$ bit may indicate that the $12^{th}$ bit in the patch bitmap is weak.

The multiple components of the query fingerprint 810 may span a predetermined amount of time. For example, the query fingerprint 810 may span one second, two seconds, ten seconds, or another period. The components may be evenly divided in time. For example, if six components are included in the query fingerprint, the time period of the fingerprint is one second long, and the frame rate of the video content is 30 frames per second, then the components may correspond to the first frame (i.e., "frame 0" in a zero-based counting system), the fifth frame, the tenth frame, the fifteenth frame, the twentieth frame, and the twenty-fifth frame of the second. Other component counts, time periods, and frame rates may be used.

In some example embodiments, the frame rate at which components are sampled is not constant. In these example embodiments, a frame may be identified by its time offset from a reference point rather than a frame number. For example, a reference fingerprint for a program may have a first frame at offset 0, a second frame at offset 0.1 seconds from the first, and a third frame at offset 0.2 seconds from the second frame. As another example, a query fingerprint may have a first frame at offset 0 from the time sampling began, a second frame at offset 0.5 seconds from the time sampling began, and a third frame at offset 0.75 seconds from the time sampling began. As can be seen by the above examples, the time references may be relative to the previous frame or relative to the start time of the sample. Other reference points may also be used.

The reference fingerprint 820 may consist of multiple components. Each component may be a fingerprint for a frame of video content. As shown in the sample component 830, and discussed above, each component may include a patch bitmap and a weak bitmap. The multiple components of the reference fingerprint 820 may span a predetermined amount of time. The predetermined amount of time spanned by the reference fingerprint 820 may be the same as the predetermined amount of time spanned by the query fingerprint 810. The components may be evenly divided in time. The reference fingerprint 820 may have a number of components less than, equal to, or greater than the number of components in the query fingerprint 810. For example, the reference fingerprint 820 may have fifteen components while the query fingerprint 810 has six. As shown in FIG. 8, the reference fingerprint 820 has a component corresponding to each even-numbered frame of one second of 30 fps video content.

In comparing the query fingerprint 810 to the reference fingerprint 820, the component frames may not align precisely. In the example shown, both the query fingerprint 810 and the reference fingerprint 820 have components for frames 0, 10, and 20, but only the query fingerprint 810 has components for frames 5, 15, and 25, and only the reference fingerprint 820 has components for frames 2, 4, 6, 8, 12, 14, 16, 18, 22, 24, 26, and 28. Several procedures are available for comparing unaligned components. For example, the nearest available component may be used or a composite component may be generated for comparison. Thus, in one example embodiment, the frame 5 component of the query fingerprint 810 is compared against the frame 4 component of the reference fingerprint 820. In another example embodiment, the frame 5 component of the query fingerprint 810 is compared against the frame 6 component of the reference fingerprint 820. In other example embodiments, the frame 5 component of the query fingerprint 810 is compared against both the frame 4 and frame 6 components of the reference fingerprint 820. Whichever distance is lower may be used as the distance between the frame 5 component of the query fingerprint 810 and the corresponding frame of the reference fingerprint 820. In yet another example embodiment, a composite component is created from the frame 4 and frame 6 components of the reference fingerprint 820.

A composite component can be created by using a number of algorithms. One example algorithm is:
1) If the patch bitmaps of the two components have the same value for a patch, use that value for the composite patch. Set the corresponding weak bit to false to indicate that the patch bit is not weak.
2) If the patch bitmaps of the two components are different, and one component has marked the patch as weak and the other has not, use the non-weak value for the composite patch. Set the corresponding weak bit to true to indicate that the patch bit is weak.
3) If the patch bitmaps of the two components are different, and the weak bits are the same, use a predetermined value (e.g., either 0 or 1) for the composite patch. Set the corresponding weak bit to true to indicate that the patch bit is weak.

According to various example embodiments, one or more of the methodologies described herein may facilitate identification of video content. Moreover, one or more of the methodologies described herein may reduce computation time on a client device performing methods of identifying video content, transmission time between a client device and a server, memory storage requirements on a server performing methods of identifying video content, and computation on a server performing methods of identifying video content.

When these effects are considered in aggregate, one or more of the methodologies described herein may obviate a need for certain efforts or resources that otherwise would be involved in identifying video content. Efforts expended by a user in identifying video content may be reduced by one or more of the methodologies described herein. Efforts expended by an advertiser in identifying users interested in particular video content may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 9:
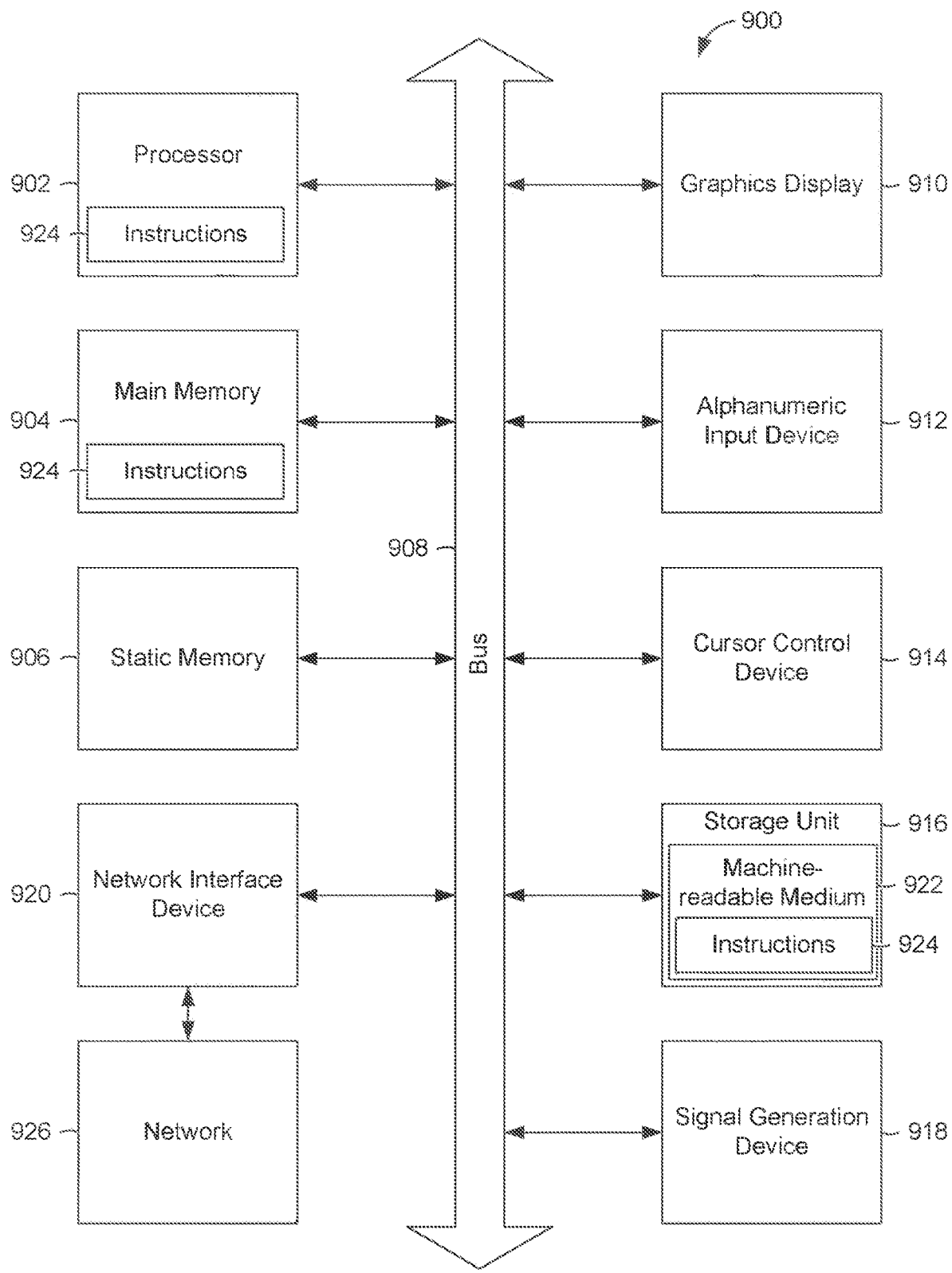
FIG. 9 is a block diagram illustrating components of a machine, according to some example embodiments, able to read instructions from a machine-readable medium and perform any one or more of the methodologies discussed herein.

FIG. 9 is a block diagram illustrating components of a machine 900, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 9 shows a diagrammatic representation of the machine 900 in the example form of a computer system and within which instructions 924 (e.g., software, a program, an application, an applet, an app, or other executable code) for causing the machine 900 to perform any one or more of the methodologies discussed herein may be executed, in whole or in part. In alternative embodiments, the machine 900 operates as a standalone device or may be connected (e.g., networked) to other machines. In a networked deployment, the machine 900 may operate in the capacity of a server machine or a client machine in a server-client network environment, or as a peer machine in a distributed (e.g., peer-to-peer) network environment. The machine 900 may be a server computer, a client computer, a PC, a tablet computer, a laptop computer, a netbook, a set-top box (STB), a smart TV, a personal digital assistant (PDA), a cellular telephone, a smartphone, a web appliance, a network router, a network switch, a network bridge, or any machine capable of executing the instructions 924, sequentially or otherwise, that specify actions to be taken by that machine. Further, while only a single machine is illustrated, the term "machine" shall also be taken to include a collection of machines that individually or jointly execute the instructions 924 to perform all or part of any one or more of the methodologies discussed herein.

The machine 900 includes a processor 902 (e.g., a central processing unit (CPU), a graphics processing unit (GPU), a digital signal processor (DSP), an ASIC, a radio-frequency integrated circuit (RFIC), or any suitable combination thereof), a main memory 904, and a static memory 906, which are configured to communicate with each other via a bus 908. The machine 900 may further include a graphics display 910 (e.g., a plasma display panel (PDP), a LED display, a LCD, a projector, or a CRT). The machine 900 may also include an alphanumeric input device 912 (e.g., a keyboard), a cursor control device 914 (e.g., a mouse, a touchpad, a trackball, a joystick, a motion sensor, or other pointing instrument), a storage unit 916, a signal generation device 918 (e.g., a speaker), and a network interface device 920.

The storage unit 916 includes a machine-readable medium 922 on which is stored the instructions 924 embodying any one or more of the methodologies or functions described herein. The instructions 924 may also reside, completely or at least partially, within the main memory 904, within the processor 902 (e.g., within the processor's cache memory), or both, during execution thereof by the machine 900. Accordingly, the main memory 904 and the processor 902 may be considered as machine-readable media. The instructions 924 may be transmitted or received over a network 926 (e.g., network 160 of FIG. 1) via the network interface device 920.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 922 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 900), such that the instructions, when executed by one or more processors of the machine (e.g., processor 902), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a FPGA or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The invention claimed is:

1. A method comprising:
accessing, by at least one computer processor, a query fingerprint corresponding to a first number of frames of video content, the first number of frames being sampled from the video content over a time period that includes a total number of frames such that the first number of frames is less than the total number of frames, wherein the query fingerprint includes first frame components corresponding to respective frames of the first number of frames,
wherein a first frame component of the first frame components comprises a patch bitmap, wherein a first bit of the patch bitmap corresponds to a value of a first patch of a first frame of the first number of frames, wherein a second bit of the patch bitmap corresponds to a second patch of the first frame that is different from the first patch;
calculating a multi-bit value corresponding to the first patch;
based on a comparison of the multi-bit value with a threshold value, determining the first bit;
determining whether the multi-bit value is within a proximity range of the threshold value;
generating a third bit corresponding to the first patch, wherein a value of the third bit corresponds to the determination of whether the multi-bit value is within the proximity range;
accessing a database of reference fingerprints associated with frames of known video content, including at least one matching reference fingerprint that matches the query fingerprint and is associated with an identifier corresponding to the video content, the at least one matching reference fingerprint including second frame components corresponding to respective frames of a second number of frames sampled from video content over the time period, wherein the second number of frames is greater than the first number of frames; and
identifying the video content based at least on the at least one matching reference fingerprint.

2. The method of claim 1, wherein at least two patches of the first frame have a different scale from each other.

3. The method of claim 1, wherein at least two patches of the first frame partially overlap.

4. The method of claim 1, wherein the query fingerprint is generated based at least on weighting a patch of the first frame according to a size of the patch.

5. The method of claim 1, wherein a format of the first number of frames of video content on which the query fingerprint is based is different from a format of the second number of frames used to generate the at least one matching reference fingerprint.

6. The method of claim 1, wherein the query fingerprint is generated based at least on identifying pillar bars in the first number of frames of video content.

7. The method of claim 1, wherein the first number of frames includes at least one frame that is not included in the second number of frames, and the second number of frames includes at least one frame that is not included in the first number of frames.

8. A system, comprising:
a memory; and
at least one computer processor communicatively coupled to the memory, configured to:
access a query fingerprint corresponding to a first number of frames of video content, the first number of frames being sampled from the video content over a time period that includes a total number of frames such that the first number of frames is less than the total number of frames, wherein the query fingerprint includes first frame components corresponding to respective frames of the first number of frames,
wherein a first frame component of the first frame components comprises a patch bitmap, wherein a first bit of the patch bitmap corresponds to a value of a first patch of a first frame of the first number of frames, wherein a second bit of the patch bitmap corresponds to a second patch of the first frame that is different from the first patch;
calculate a multi-bit value corresponding to the first patch;
based on a comparison of the multi-bit value with a threshold value, determine the first bit;
determine whether the multi-bit value is within a proximity range of the threshold value; and
generate a third bit corresponding to the first patch, wherein a value of the third bit corresponds to the determination of whether the multi-bit value is within the proximity range;
access a database of reference fingerprints associated with frames of known video content, including at least one matching reference fingerprint that matches the query fingerprint and is associated with an identifier corresponding to the video content, the at least one matching reference fingerprint including second frame components corresponding to respective frames of a second number of frames sampled from video content over the time period, wherein the second number of frames is greater than the first number of frames; and
identify the video content based at least on the at least one matching reference fingerprint.

9. The system of claim 8, wherein at least two patches of the first frame partially overlap.

10. The system of claim 8, wherein the query fingerprint is generated based at least on weighting a patch of the first frame according to a size of the patch.

11. The system of claim 8, wherein a frame rate at which the first frame components are sampled is not constant, the at least one computer processor is further configured to: identify the first frame by a time offset relative to a previous frame.

12. The system of claim 8, wherein a frame rate at which the first frame components are sampled is not constant, the at least one computer processor is further configured to: identify the first frame by a time offset relative to a start time of the first frame components.

13. The system of claim 8, wherein an additional bit corresponding to the first patch indicates whether the first bit is weak or not.

14. The system of claim 8, wherein two weak bits are assigned to the first frame, the at least one computer processor is further configured to:
determine two patches corresponding to the patch bitmap whose values are closest to the threshold value; and
assign the two patches as weak, whereas remaining patches corresponding to the patch bitmap are assigned as not weak.

15. A non-transitory machine-readable medium having instructions embodied thereon which, when executed by at least one computer processor, cause the at least one computer processor to perform operations comprising:
accessing a query fingerprint corresponding to a first number of frames of video content, the first number of frames being sampled from the video content over a time period that includes a total number of frames such that the first number of frames is less than the total number of frames, wherein the query fingerprint includes first frame components corresponding to respective frames of the first number of frames,
wherein a first frame component of the first frame components comprises a patch bitmap, wherein a first bit of the patch bitmap corresponds to a value of a first patch of a first frame of the first number of frames, wherein a second bit of the patch bitmap corresponds to a second patch of the first frame that is different from the first patch;
calculating a multi-bit value corresponding to the first patch;
based on a comparison of the multi-bit value with a threshold value, determining the first bit;
determining whether the multi-bit value is within a proximity range of the threshold value;
generating a third bit corresponding to the first patch, wherein a value of the third bit corresponds to the determination of whether the multi-bit value is within the proximity range;
accessing a database of reference fingerprints associated with frames of known video content, including at least one matching reference fingerprint that matches the query fingerprint and is associated with an identifier corresponding to the video content, the at least one matching reference fingerprint including second frame components corresponding to respective frames of a second number of frames sampled from video content over the time period, wherein the second number of frames is greater than the first number of frames; and
identifying the video content based at least on the at least one matching reference fingerprint.

16. The non-transitory machine-readable medium of claim 15, wherein the query fingerprint is generated based at least on identifying pillar bars in the first number of frames of video content.

17. The non-transitory machine-readable medium of claim 15, wherein the first number of frames includes at least one frame that is not included in the second number of frames, and the second number of frames includes at least one frame that is not included in the first number of frames.

18. The non-transitory machine-readable medium of claim 15, wherein a number of bits in the patch bitmap is larger than a number of patches of the first frame, and excess bits are set to zero.

19. The non-transitory machine-readable medium of claim 15, wherein a frame rate at which the first frame components are sampled is not constant, the operations further comprise: identifying the first frame by a time offset relative to a previous frame.

20. The non-transitory machine-readable medium of claim 15, wherein a frame rate at which the first frame components are sampled is not constant, the operations further comprise: identifying the first frame by a time offset relative to a start time of the first frame components.

* * * * *